(12) United States Patent
Zhang et al.

(10) Patent No.: US 6,407,861 B1
(45) Date of Patent: Jun. 18, 2002

(54) ADJUSTABLE OPTICAL CIRCULATOR

(75) Inventors: B. Barry Zhang, Lawrenceville, NJ (US); Liang-Ju Lu, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/286,816

(22) Filed: Apr. 6, 1999

(51) Int. Cl.$^7$ ................................. G02B 5/30
(52) U.S. Cl. .................. 359/484; 359/487; 359/495; 359/497; 359/900; 359/282; 385/11; 385/33; 356/491
(58) Field of Search ................. 359/484, 485, 359/487, 495, 496, 497, 900, 281, 282; 385/11, 33; 356/491

(56) References Cited

U.S. PATENT DOCUMENTS

| | | | |
|---|---|---|---|
| 3,658,405 A | * 4/1972 | Pluta | 359/371 |
| 3,677,621 A | * 7/1972 | Smith | 359/495 |
| 3,700,309 A | * 10/1972 | Skolnick et al. | |
| 3,767,290 A | * 10/1973 | Lang et al. | |
| 4,272,159 A | 6/1981 | Matsumoto | |
| 4,294,509 A | 10/1981 | Nagao | |
| 4,447,722 A | * 5/1984 | Saimi | |
| 4,464,022 A | 8/1984 | Emkey | |
| 4,482,202 A | 11/1984 | Nagao | |
| 4,650,289 A | * 3/1987 | Kuwahara | |
| 4,746,216 A | * 5/1988 | Sommargren | |
| 4,762,384 A | 8/1988 | Hegarty et al. | |
| 4,844,593 A | * 7/1989 | Parker et al. | 359/487 |
| 4,868,804 A | * 9/1989 | Le Carvennec et al. | |
| 4,988,170 A | 1/1991 | Buhrer | |
| 4,991,938 A | 2/1991 | Buhrer et al. | |
| 5,204,771 A | 4/1993 | Koga | |
| 5,212,586 A | 5/1993 | Van Delden | |
| 5,268,787 A | * 12/1993 | McIntyre | |
| 5,319,483 A | 6/1994 | Krasinski et al. | |
| 5,471,340 A | 11/1995 | Cheng et al. | |
| 5,504,619 A | * 4/1996 | Okazaki | 359/495 |
| 5,515,202 A | * 5/1996 | Wright | |
| 5,574,596 A | 11/1996 | Cheng | |
| 5,588,078 A | 12/1996 | Cheng et al. | |
| 5,682,446 A | 10/1997 | Pan et al. | |
| 5,689,593 A | 11/1997 | Pan et al. | |
| 5,963,372 A | * 10/1999 | Barak | 359/496 |
| 5,999,313 A | * 12/1999 | Fukushima | 359/484 |
| 6,137,574 A | * 10/2000 | Hill | |

FOREIGN PATENT DOCUMENTS

| | | | | |
|---|---|---|---|---|
| JP | 58-132214 | * | 8/1983 | 359/487 |
| JP | 1-79722 | * | 3/1989 | 359/484 |
| WO | WO 95/16216 | | 6/1995 | |
| WO | WO 97/05518 | | 2/1997 | |
| WO | WO 97/22034 | | 6/1997 | |

* cited by examiner

Primary Examiner—Ricky D. Shafer
(74) Attorney, Agent, or Firm—Altera Law Group, LLC

(57) ABSTRACT

Optical circulators can be formed with one or more adjustable components to facilitate the optimization of light coupling into the ports of the circulator. In particular, an optical circulator includes one or more adjustable mirrors positioned in the propagation path of a light beam travelling from a first port to a third port, typically via a second port, through the circulator. The one or more adjustable mirrors permit the deviation of the propagation path of the light beam to achieve better input precision into the circulator. One example of a method of circulating light from a first port to a third port includes propagating light from a first port through a reflective polarizer to a second port. The light then propagates from the second port into the reflective polarizer and is reflected from the reflective polarizer to a first mirror. The light is then reflected from the first mirror through the reflective polarizer to a second mirror, where at least one of the first and second mirrors is adjustable to alter a propagation path of the light propagating between the first and second mirrors. The light is reflected from the second mirror into the reflective polarizer and then from the reflective polarizer to a third port.

32 Claims, 5 Drawing Sheets

US 6,407,861 B1

ADJUSTABLE OPTICAL CIRCULATOR

FIELD OF THE INVENTION

This invention relates to optical circulators, in particular to an optical circulator with adjustable alignment.

BACKGROUND OF THE INVENTION

Non-reciprocal devices are used in microwave and optical communications for selectively directing signals from one port to another. With the growth in fiber optic communications, there is an increasing demand for non-reciprocal components that are suitable for use with fiber optic systems. For example, isolators are used for increasing the stability of the frequency and power produced by single mode semiconductor lasers by reducing the power of light feeding back into the laser. As fiber optic systems become more sophisticated, for example with the advent of wavelength division multiplexing (WDM), add/drop demultiplexing and bidirectional transmission, there is an increased need for advanced components such as optical circulators.

Many optical circulators are of the three port design, in which light incident at the first port is transmitted through the circulator to the second port. This light may then be transmitted to another optical device. Light entering the circulator from the second port is transmitted through the circulator to a third port. The third port may be situated close to the first port and, in some cases, the first and third ports include optical fibers held together by a common holder, such as a ferrule.

Present approaches to circulator design often rely on the accuracy of the position of the fibers at the ports of the circulator and/or the precision of the alignment of the optical components of the circulator. Typically, conventional circulators are aligned by moving the first port and/or second port relative to each other. However, if the third port is held in a particular position relative to the first port, which is often the case, there is either no freedom or only very limited freedom to adjust the position of the third port to optimize the coupling of light from the second port, into the third port. Consequently, there may be a power loss if the ports and components of the circulator are not accurately positioned.

SUMMARY OF THE INVENTION

Generally, the present invention relates to optical circulators with one or more alignable reflecting components that permit the optimization of light coupling into the ports of the circulator. In particular, an optical circulator includes a reflective polarizer adapted to transmit light having a first polarization direction and reflect light having a second polarization direction orthogonal to the first polarization direction. A first non-reciprocal polarization rotator is positioned to transmit light propagating in a first direction from the reflective polarizer, and a second non-reciprocal polarization rotator is positioned to transmit light reflected by the reflective polarizer after propagating in a second direction opposite to the first direction. A first reflector reflects light from the second non-reciprocal polarization rotator to the reflective polarizer and a third non-reciprocal polarization rotator is positioned to transmit light reflected by the first mirror. A second reflector reflects light from the third non-reciprocal polarization rotator to the reflective polarizer. At least one of the first mirror and second mirror is adjustable to alter a propagation path of a light beam propagating through the optical circulator.

In another embodiment of the invention, a circulator includes means for propagating light from a first port to a second port through a reflective polarizer; means for propagating light from the second port to a third port through the reflective polarizer; means for rotating polarization of light passing from the first port to the second port and from the second port to the third port; and means for rotating light polarization and for reflecting light deflected by the reflective polarizer back to the reflective polarizer, the means for reflecting light being adjustable so as to alter a propagation path of light propagating between one of the first and second ports and the second and third ports.

A method of circulating light from a first port to a third port includes propagating light from a first port through a reflective polarizer to a second port, propagating the light from the second port into the reflective polarizer, and reflecting the light from the reflective polarizer to a first mirror. The method further includes reflecting the light from the first mirror through the reflective polarizer to a second mirror, wherein at least one of the first and second mirrors is adjustable to alter a propagation path of the light propagating between the first and second mirrors, reflecting the light from the second mirror into the reflective polarizer; and reflecting the light from the reflective polarizer to a third port.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
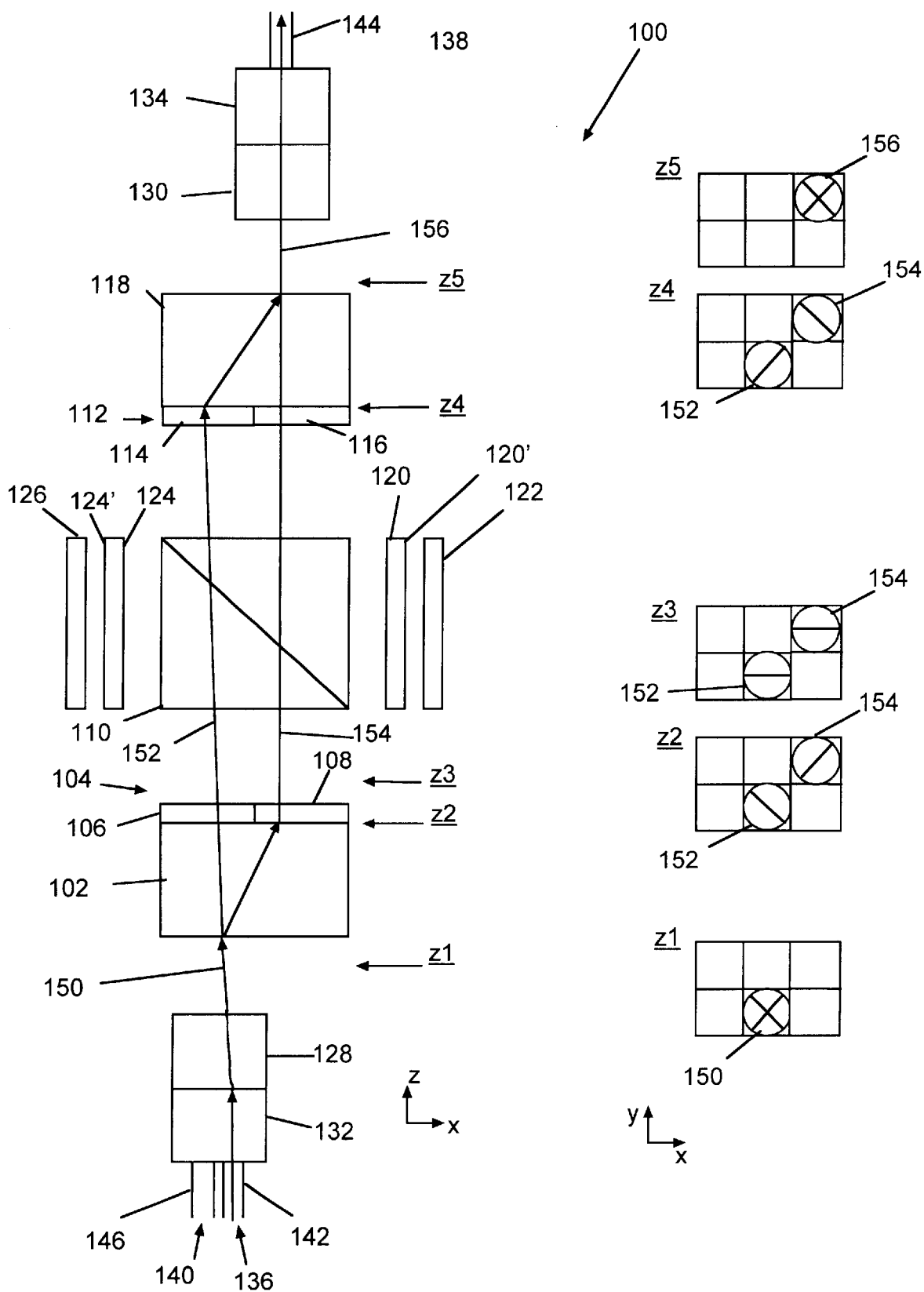
FIG. 1 is a schematic side view of one example of a circulator according to an embodiment of the present invention, illustrating the path of light travelling from a first port to a second port.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to optical circulators and, in particular, to an optical circulator with one or more adjustable components, such as adjustable mirrors, to facilitate alignment of a light beam through the circulator. While the present invention is not so limited, an appreciation of various aspects of the invention will be gained through a discussion of the examples provided below.

One particular embodiment of an optical circulator includes at least one or two adjustable mirrors. For example, light entering the circulator through the first port is directed through a number of optical elements to the second port. Light entering the circulator through the second port is directed through the circulator and is reflected off the adjustable mirrors to the third port. The orientation of the adjustable mirrors may be adjusted to maximize the amount of light entering the third port.

FIG. 1 illustrates an optical circulator 100 that includes a first birefringent splitting and combining element 102, a first set 104 of non-reciprocal polarization rotators 106 and 108, a reflective polarizer 110, a second set 112 of non-reciprocal polarization rotators 114 and 116, a second birefringent splitting and combining element 118, a fifth non-reciprocal polarization rotator 120, a first adjustable mirror 122, a sixth non-reciprocal polarization rotator 124, and a second adjustable mirror 126. Typically, light is coupled into the circulator 100 from the first port 136.

The birefringent splitting and combining elements 102 and 118 are formed from birefringent crystals. Birefringent crystals manifest a well-known phenomenon referred to here as birefringent walk-off. When an unpolarized light beam passes into a birefringent crystal, the unpolarized beam is split into two beams, an ordinary beam and an extraordinary beam. This occurs because the refractive indices of the ordinary and extraordinary beams are different. The ordinary and extraordinary beams propagate in different directions through the crystal, and so one beam is said to "walk-off" from the other. If the ordinary and extraordinary beams are directed through the birefringent crystal along opposing directions from their walk-off directions, then the two beams may be combined in the birefringent crystal.

The crystal axes of the first and second birefringent splitting and combining elements 102, 118 may be oriented so that the plane formed by the ordinary and extraordinary beams in the first birefringent element 102 is parallel with the plane formed by the ordinary and extraordinary beams in the second birefringent element 118.

The birefringent elements 102, 118 may be formed from any suitable birefringent material, such as crystalline quartz, lithium niobate, and yttrium ortho-vanadate ($YVO_4$). The birefringent crystal is typically transparent to the light passing through the crystal. A larger birefringence results in a greater angular separation between the ordinary and extraordinary beams, i.e. a greater walk-off angle, thus permitting a specific spatial separation between the ordinary and extraordinary beams to be achieved in a shorter birefringent crystal. The material $YVO_4$ is particularly advantageous for this purpose, since it has a large birefringence.

The polarization states of the beam travelling from the first port 136 to the second port 138 are illustrated to the right of FIG. 1. The polarization states are shown for the beam, or beams, at planes denoted z1, z2 . . . z5, and are presented as viewed looking along the direction of propagation of the beam from the first port 136, i.e. along the z-axis. The polarization state of the unpolarized beam 150 entering the first birefringent element 102 is shown at position z1 as a mixed polarization state.

The input beam 150 enters the first birefringent element 102, where it is split into two beams 152 and 154 having orthogonal polarizations. The two beams 152 and 154 are typically separated without any overlap upon exiting the first birefringent element 102. The polarization states of the first and second beams 152 and 154 are shown for the position z2. Upon exiting the first birefringent element 102, the two beams 152 and 154 enter the first and second non-reciprocal polarization rotators 106 and 108 respectively.

The non-reciprocal polarization rotators 106, 108, 114, 116, 120, 124 may be, for example, Faraday rotators. A Faraday rotator is a non-reciprocal polarization rotator in that light passing through a Faraday rotator in one direction may have its polarization rotated through a certain angle in a clockwise direction, as viewed along the direction of propagation. The polarization of the light passing through the Faraday rotator in the opposite direction is rotated through the same angle in the counter-clockwise direction, as viewed along the direction of propagation. In contrast, a reciprocal polarization rotator, such as a half-wave retardation plate, rotates the polarization of light in the same sense, e.g. clockwise, irrespective of the direction of propagation through the plate.

Faraday rotators typically include a transparent material, having a high Verdet constant, that is coupled to a magnet. The magnet produces a magnetic field having a component parallel to the direction of propagation of light within the Faraday rotator. Materials with high Verdet constants include, for example, bismuth-terbium iron garnets, which are often used in Faraday rotators operating at wavelengths in the range 1.3 $\mu$m to 1.55 $\mu$m. Other materials are available for other wavelength ranges. Furthermore, other materials are available that do not require the use of an external magnet, for example bismuth-substituted rare-earth iron garnets.

The first set 104 of non-reciprocal polarization rotators 106 and 108 is positioned so that the first beam 152 passes through the first polarization rotator 106, where its polarization is rotated by approximately 45° in a counter-clockwise direction. The second beam 154 passes through the second polarization rotator 108, where its polarization is rotated by approximately 45° in a clockwise direction. Therefore, the two beams 152 and 154 have parallel polarizations before entering the reflective polarizer 110, as shown for position z3. The polarizations of the two beams 152 and 154 are oriented so that they are transmitted by the reflective polarizer 110.

The reflective polarizer 110 typically transmits light having a first polarization direction, referred to here as the transmitted polarization, and reflects light having a second polarization direction orthogonal to the first polarization direction. The second polarization is referred to here as the reflected polarization. Examples of suitable reflective polarizers 110 include a polarizing beam splitter and a reflective polarizing plate.

After propagating through the polarizer, the beams 152 and 154 are incident on third and fourth non-reciprocal polarization rotators 114 and 116. The third non-reciprocal polarization rotator 114 rotates the polarization of the first beam 152 by approximately 45° in a counter-clockwise direction. The fourth non-reciprocal polarization rotator 116 rotates the polarization of the first beam 154 by approximately 45° in a clockwise direction. The polarization states of the first and second beams after propagating out of the non-reciprocal polarization rotators 114 and 116 are shown for the plane at position z4.

After propagating through the non-reciprocal polarization rotators 114 and 116, the first and second beams 152 and 154 enter the second birefringent element 118, which is oriented so as to combine the first and second beams into a first output beam 156. The first output beam 156 has a mixed polarization state, as illustrated in the polarization indicator for the plane at position z5. The first output beam 156 then propagates to the second port 138.

In the particular embodiment illustrated, the first beam 152 propagates in the first birefringent element 102 as an ordinary beam and in the second birefringent element 118 as an extraordinary beam, while the second beam 154 propagates in the first birefringent element 102 as an extraordinary beam and in the second birefringent element 118 as an ordinary beam. This is not a requirement of the invention, and the first beam 152 may, for example propagate through both birefringent elements 102 and 118 as an ordinary beam, while the second beam 154 propagates through both birefringent elements 102 and 118 as an extraordinary beam, or vice versa. The polarization direction of the beams depend on the rotation direction of the polarization rotators.

Figure 2:
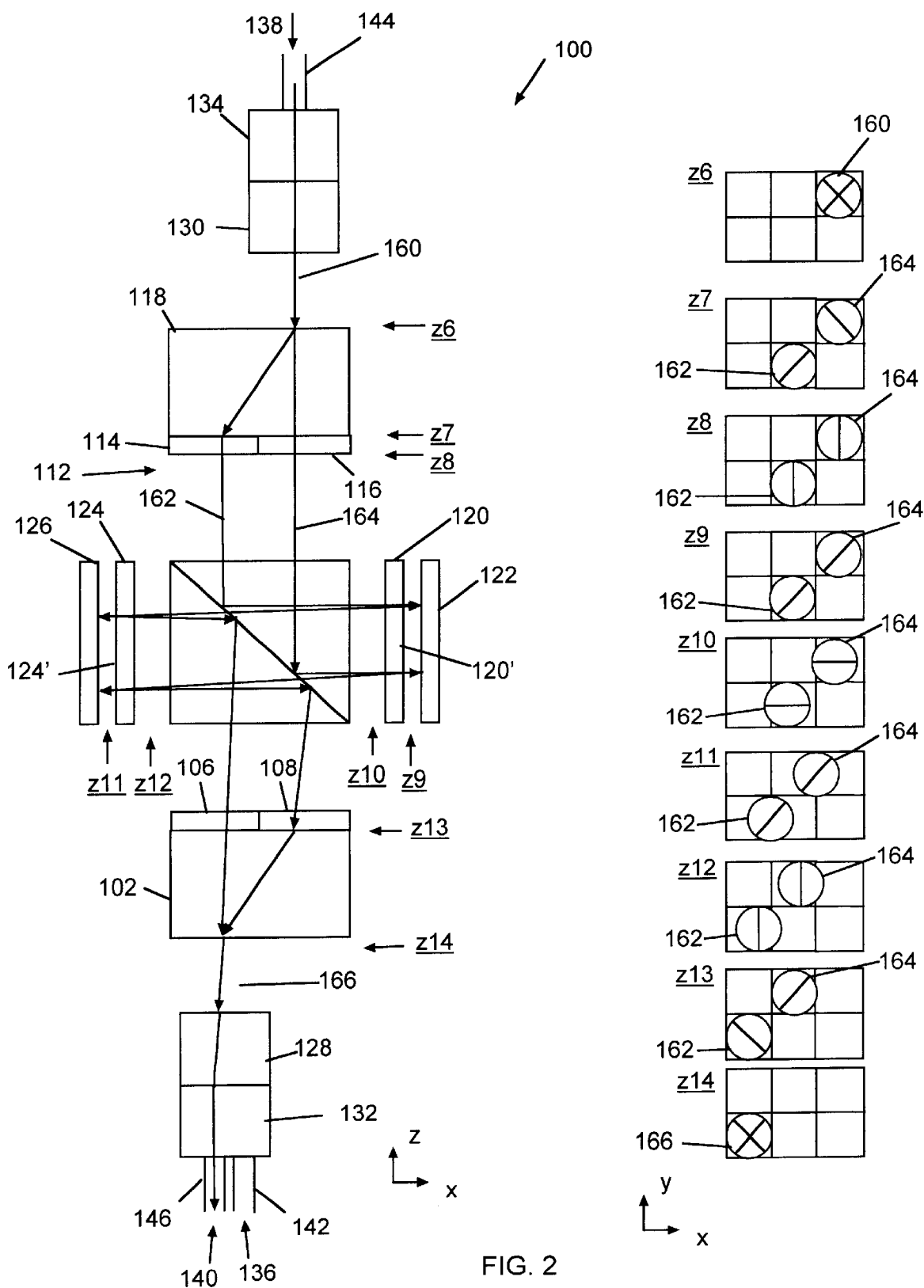
FIG. 2 is a schematic side view of the circulator of FIG. 1 showing the path of light travelling from the second port to a third port.

The propagation of light through the circulator 100 from the second port 138 to the third port 140 is illustrated in FIG. 2. The polarization states of the light at various positions as it propagates from the second port 138 are illustrated on the right side of the figure. In all cases, the polarization states are given as viewed looking in a reverse direction along the direction of propagation, i.e. generally from the third port 140 to the second port 138.

The input beam 160 from the second fiber 144 is unpolarized, as illustrated by the polarization indicator for position z6. The input beam 160 is incident on the second birefringent element 118, and is split into two beams 162 and 164 having orthogonal polarizations. The polarization states for the two beams 162 and 164 are illustrated for the position z7, at the exit face of the second birefringent element 118.

The two beams 162 and 164 pass back through the third and fourth non-reciprocal polarization rotators 114 and 116. The third non-reciprocal polarization rotator 114 rotates the polarization of the first beam 162 by 45° in a counterclockwise direction, while the fourth third non-reciprocal polarization rotator 116 rotates the polarization of the second beam 164 by 45° in a clockwise direction, to produce the polarization as shown for position z8.

The first and second beams 162 and 164 enter the reflective polarizer 110 with polarization directions that are both parallel to the reflecting polarization. The polarization at this point is perpendicular to the polarization direction on the first pass through the polarizer 110 from the first port 136 to the second port 144. The two beams 162 and 164 have, therefore, the reflecting polarization. The reflective polarizer 110 reflects the first and second beams 162 and 164 towards the first mirror 122. Before the first and second beams 162 and 164 reach the first mirror 122, they pass through the fifth non-reciprocal polarization rotator 120, which rotates the polarization of the two beams 162 and 164 by approximately 45°. Therefore, after passing through the fifth non-reciprocal polarization rotator 120, the two beams 162 and 164 have polarization directions as given for position z9.

The two beams 162 and 164 reflect off the first mirror 122 and pass back through the fifth non-reciprocal polarization rotator 120 for a further 45° rotation. Therefore, after double passing through the fifth non-reciprocal polarization rotator 120, the polarization of the two beams has been flipped by 90°, as illustrated by the polarization indicators for position z10.

The two beams 162 and 164 now have the transmitted polarization, and pass through the reflective polarizer 110 towards the second mirror 126. The two beams experience a double pass through the sixth non-reciprocal polarization rotator 124 via the second mirror 126. After the first pass through the sixth non-reciprocal polarization rotator 124, the polarization states of the first and second beams 162 and 164 is as given for position z11. After reflecting off the second mirror 126, and passing through the sixth non-reciprocal polarization rotator 124 for a second time, the polarization state of the two beams 162 and 164 is as shown for position z12. The two beams 162 and 164 have the reflecting polarization.

When they pass into the reflecting polarizer 110, the two beams 162 and 164 are reflected out, in a direction towards the first birefringent element 102. The two beams 162 and 164 pass respectively pass back through the first and second non-reciprocal polarization rotators 106 and 108, where their polarizations are rotated through approximately 45° in counter-clockwise and clockwise directions respectively. The polarization states of the two beams 162 and 164, after passing through the first and second non-reciprocal polarization rotators 106 and 108 are illustrated for position z13.

The two beams 162 and 164 enter the first birefringent element 102 in the reverse direction from before, and are combined to produce a second output beam 166, which is directed towards the third fiber 146. The polarization state of the second output beam 166 is illustrated for position z14.

The orientations of the first and second mirrors 122, 126 are independently adjustable, thereby permitting the user to "walk" the second output beam 166 into the third fiber 146, thus maximizing optical coupling from the second fiber 144 into the third fiber 146.

The first and second mirrors may be formed as separate mirrors or as reflecting surfaces on the fifth and sixth non-reciprocal polarization rotators 120, 124, respectively. For example, back surfaces 120', 124' of the rotators 120, 124 may be coated with a reflective coating and the rotators 120, 124 adjustably mounted so as to permit steering of the reflected beam. The first and second adjustable mirrors 122, 126 are typically adjustably mounted to allow swiveling so that the angle of incidence of the light beam from the reflective polarizer 110 on the mirrors 122 and 126 may be altered. Typically, the orientations of the first and second adjustable mirrors 122, 126 are adjustable over a range of a few degrees.

Figure 3A:
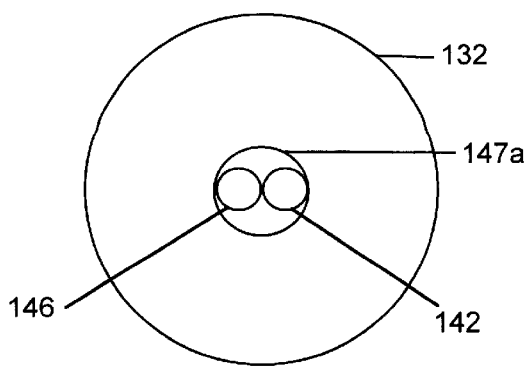
FIGS. 3A–3D show schematic end views of different embodiments of ferrule for holding two fibers.

The ports 136, 138 and 140 are points of entry for light into and out of the circulator 100. Each port may be formed, for example, by an optical fiber that is optically coupled to an associated lens. In one approach, the first and third ports 136 and 140 may formed by first and third fibers 142 and 146 mounted in a ferrule 132, with a single collimating lens 128 for collimating light transmitted out of the first fiber 142 and for focusing light entering the third fiber 146. An end view of the ferrule 132 is illustrated in FIG. 3A, which shows an aperture 147a to receive the first and third fibers 142 and 146 respectively. The fibers 142 and 146 may be epoxied into the aperture 147a. The lens 128 may be a gradient index (GRIN) lens, or other type of lens having a numerical aperture suitable for collimating light from a fiber. The GRIN lens is commonly used in conjunction with optical fibers due to its barrel shape and flat optical surfaces. It is common to cut the faces of the fibers and the GRIN lens at a small angle, for example approximately 8°, to prevent reflective feedback. The collimated light beam output from the first fiber 142 operates as the first beam 150.

Figure 3B:
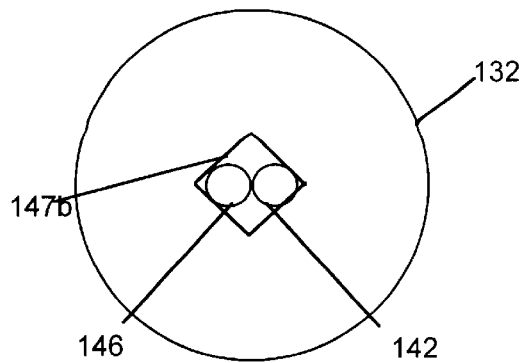
Figure 3C:
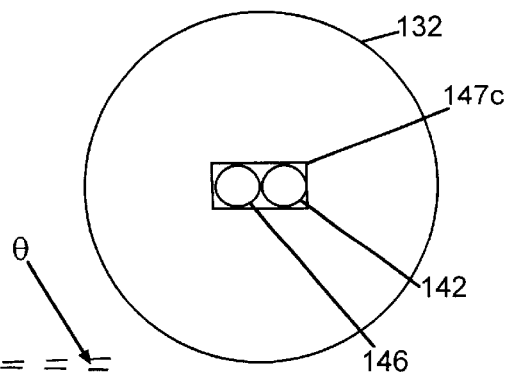
Figure 3D:
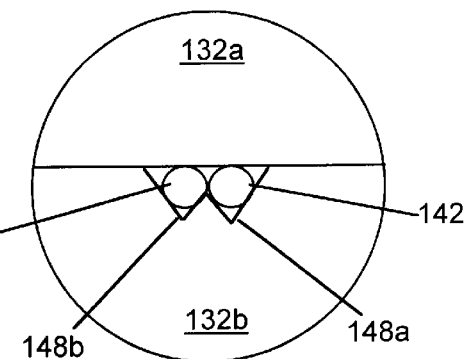

The ferrule 132 may use apertures shaped differently from that shown in FIG. 3B to hold the fibers 142 and 146. For example, the ferrule 132 shown in FIG. 3B has a diamond-shaped aperture 147b, while the ferrule 132 in FIG. 3C has a rectangular aperture 147c. Another embodiment of a ferrule 132, illustrated in FIG. 3D has upper and lower portions 132a and 132b, where the lower portion 132b has adjacent "V-grooves" 148a and 148b to receive the fibers 142 and 146. The upper portion 132a holds the fibers 142 and 146 in the V-grooves 148a and 148b. One advantage of this embodiment is that the position of the fibers 142 and 146 may be very precise because of the accurate placement of the V-grooves 148a and 148b.

The second port 138 may be formed from a single fiber 144 mounted in a ferrule 134 that is coupled to a lens 130. The first output beam 156 is focused by the second lens 130 into the second fiber 144.

The displacement of the second output light beam 166 relative to the first input light beam 150 can be adjusted using the first and second adjustable mirrors 122 and 126. The orientations of the first and second adjustable mirrors 122 and 126 may be adjusted to align the light beam 166 with the third port 140. In one method of operation, the first and second ports 136, 138 are aligned by moving the first and second ports relative to each other. The first and second adjustable mirrors 122, 126 may then be adjusted to maximize the amount of light directed into the third port 140.

Figure 4A:
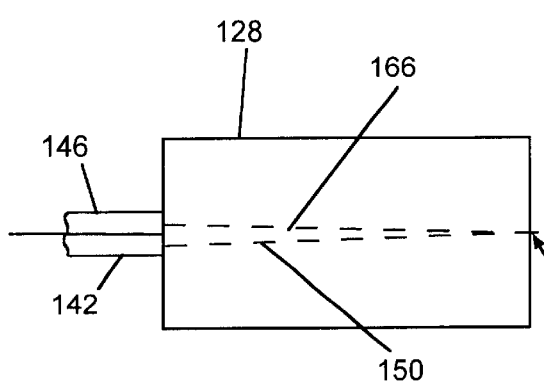
FIG. 4A is a schematic view showing an optical coupling scheme for two fibers with a single collimating lens.
Figure 4B:
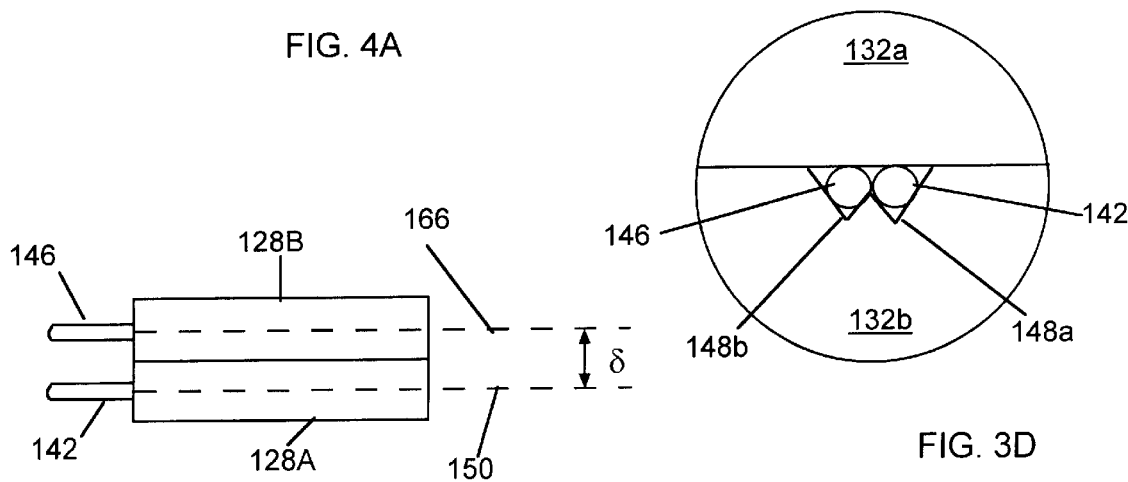
FIG. 4B is a schematic view showing an optical coupling scheme for two fibers with separate collimating lenses.

An advantage of the circulator 100 is illustrated in FIGS. 4A and 4B. First, consider the optical geometry of FIG. 4A, which shows the first and third fibers 142 and 146, and the GRIN lens 128. The directions of the first input beam 150 from the first fiber 142, and the second output beam 166 into the third fiber 146 are shown to have a crossing angle therebetween, denoted as θ. The crossing angle θ arises from the fact that the first and third fibers 142 and 146 do not lie on the axis of the lens 128 and so, in addition to serving a collimation function, the lens 128 also deviates the beams 150 and 166 relative to its axis. One advantage of the circulator 100 is that the two mirrors 122 and 126 may be adjusted to walk the beams 162 and 164 so that the resulting output beam 166 crosses the input beam 150 at the selected point, marked "A", and with the selected crossing angle, θ. Therefore, the collimator 100 is effective for maximizing optical coupling into the third fiber 146 when the first and third fibers 142 and 146 share the same collimating lens 128.

Another advantage of the collimator may be understood in consideration of FIG. 4B. Here, the first and third fibers 142 and 146 are each provided with individual collimating lenses 128A and 128B respectively. Since each fiber 142 and 146 may be mounted on the axis of its associated lens 128A and 128B respectively, the beams 150 and 166 lie parallel to each other, but with a lateral separation, δ, which is equal to the center-to-center spacing between the fibers 142 and 146. An advantage provided by the circulator 100 is that the two reflectors 122 and 126 may be adjusted to "walk" the beams 162 and 164 so that the second output beam 166 lies parallel to the input beam 150, but laterally separated by an amount δ. Therefore, the collimator is effective for maximizing optical coupling into the third fiber 146 when the first and third fibers 142 and 146 have independent collimating lenses 128A and 128B.

The circulator 100 may be provided without fibers, or with fiber "pigtails" in place for coupling to external fibers in a fiber system.

Various modifications may be made to provide other circulator configurations. For example, other lenses and/or mirrors may be used to redirect the light beam 166 or light beams 162, 164 to a third port that is not proximate to the first port. These configurations may, in some instances, include additional components such as a third set of non-reciprocal polarization rotators and/or a third birefringent splitting and combining element.

In another configuration, only one of the mirrors may be adjustable, the other being fixed. Additionally, the mirrors may be integrated with the fifth and/or sixth non-reciprocal polarization rotators. For example, the fifth and/or sixth non-reciprocal polarization rotator may have a reflective coating on a rear surface and be orientationally adjustable.

In another embodiment, the reflective polarizer may be positioned and aligned so that light from the first port is reflected off the first and second mirrors prior to arriving at the second port. Light from the second port then typically travels directly through the reflective polarizer to the third port.

Figure 5:
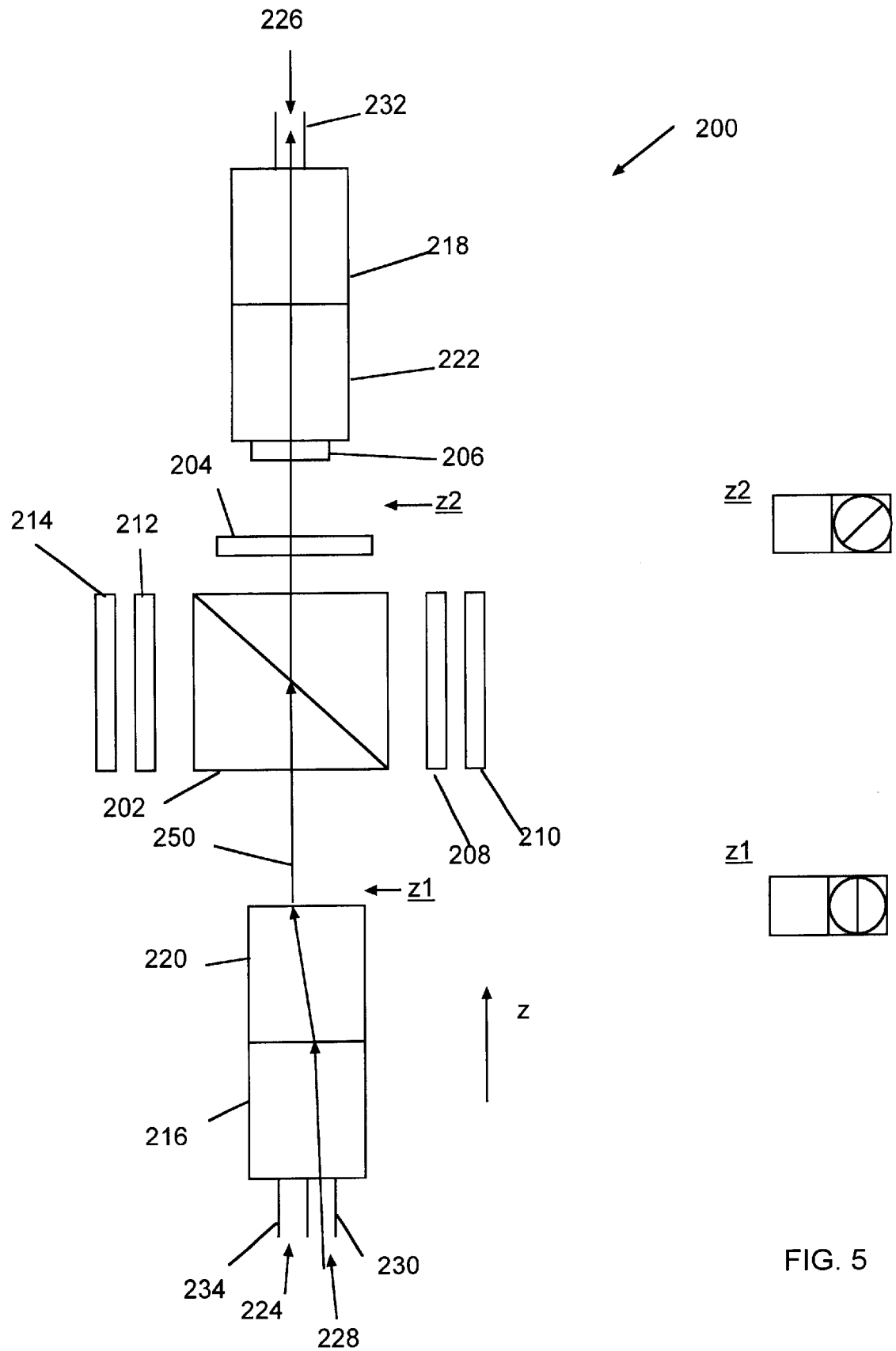
FIG. 5 is a schematic side view of one example of another embodiment of the present invention, showing the path of light travelling from a first port to a second port.

Another circulator 200, illustrated in FIG. 5, may be used for circulating light having a single polarization or for circulating light where only one polarization is of interest. The circulator 200 includes a reflective polarizer 202, a first non-reciprocal polarization rotator 204, a polarizer 206, a second non-reciprocal polarization rotator 208, a first adjustable mirror 210, a third non-reciprocal polarization rotator 212, and a second adjustable mirror 214. Light entering the circulator 200 through a first port 224 is directed to a second port 226, and light entering the circulator 200 from the second port 226 is directed to the third port 228.

A light beam 250, a portion of which has a first polarization direction parallel to a transmitted polarization, as shown for position z1, propagates from the first port 224 to the reflective polarizer 202. The reflective polarizer 202 is positioned and aligned to transmit light having the first polarization direction. The light beam 250 may include only light with the first polarization or may include a portion that has a second orthogonal polarization.

The circulator 200 typically operates to only transmit that portion of the light beam 250 having the transmitting polarization. Light in beam 250 having the reflecting polarization is reflected by the reflective polarizer 202 toward the second mirror 214 and then to the first mirror 210 and finally toward the second port 226. Typically, this light is removed by the polarizer 206 and/or, due to the adjustment of the mirrors 210 and 214, the light propagating in the z-direction is directed away from the second port 226.

The light beam 250 propagates from the reflecting polarizer 202 to the first non-reciprocal polarization rotator 204, configured to rotate the polarization direction of the light beam 250 by approximately 45°, as shown for position z2. The light beam 250 then propagates through the polarizer 206 that is aligned to maximally transmit light having the polarization orientation illustrated for position z2, and is directed to the second port 226.

Figure 6:
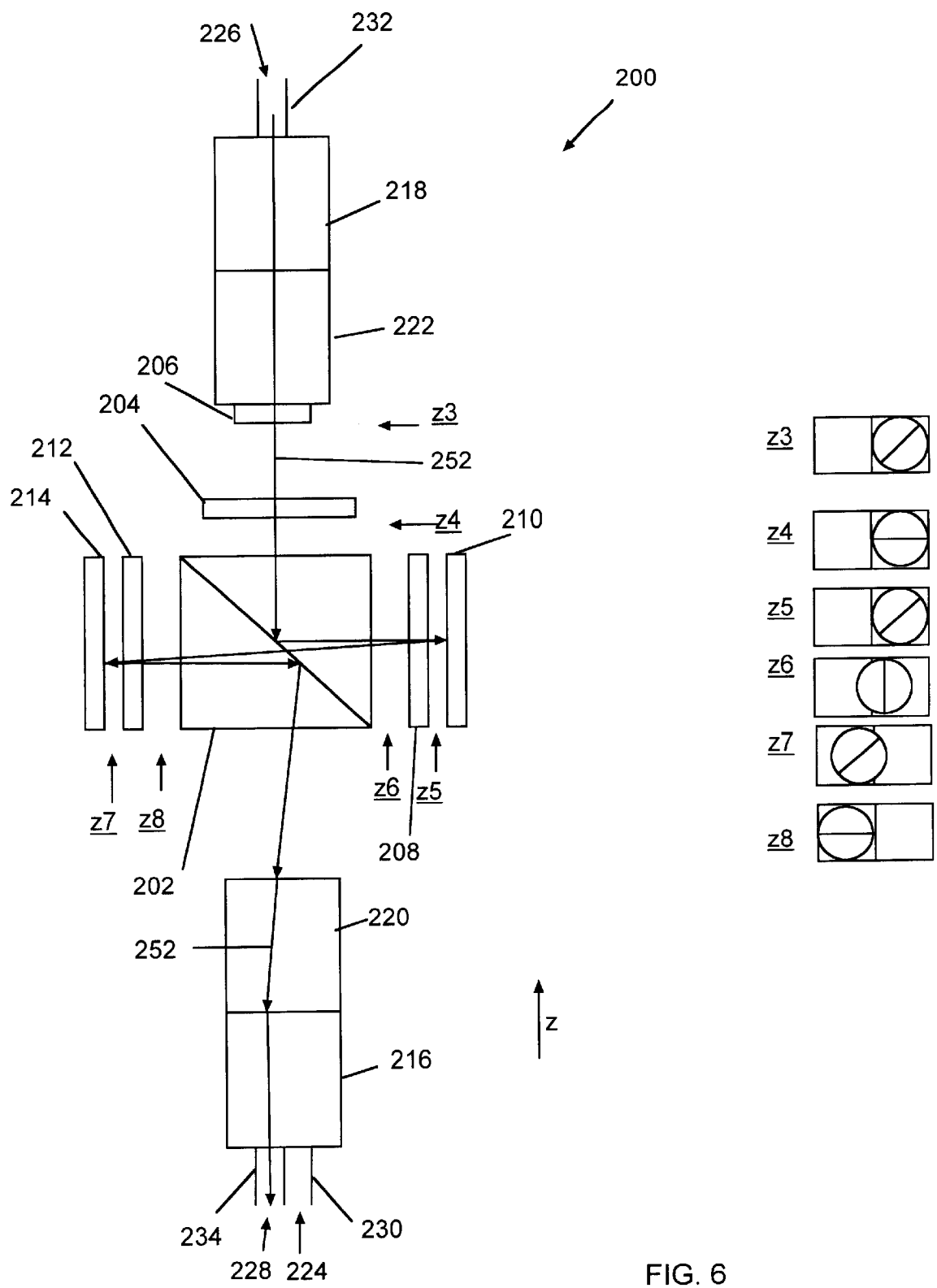
FIG. 6 is a schematic side view of the circulator of FIG. 5 showing the path of light travelling from the second port to a third port.

The propagation of a second light beam 252 from the second port 226 through the circulator 200 to a third port 228 is illustrated in FIG. 6. The light beam 252 propagates from the second port 226 to the polarizer 206 where light not having the selected polarization is removed. Therefore, only light whose polarization direction is illustrated for the position z3 is passed by the polarizer 206 towards the non-reciprocal polarization rotator 204.

The first non-reciprocal polarization rotator 204 rotates the polarization of the light beam 262 by approximately 45° so that the light beam 262 has the reflecting polarization (orthogonal to the transmitting polarization), as shown for position z4.

The light beam 252 propagates into the reflective polarizer 202 and is reflected towards the first mirror 210. The light beam 252 passes through the second non-reciprocal polarization rotator 208, which rotates the polarization direction of the light beam 252 by 45°, as shown for position z5, and then reflects off the first mirror 210. The light beam 252 passes back through the second non-reciprocal polarization rotator 208, rotating the polarization by a further 45°. The light beam 252 now has the transmitting polarization, as shown for position z6, and therefore passes through the reflective polarizer 202 towards the second mirror 214.

The light beam 252 propagates through the third non-reciprocal polarization rotator 212 where the polarization direction of the light beam is rotated by 45°, as shown for position z7. The light beam 252 is then reflected by the second mirror 214 back through the third non-reciprocal polarization rotator 212 for another rotation of 45°. Propagation twice through the third non-reciprocal polarization rotator 212 leaves the light beam with its polarization in the reflecting polarization direction, as shown for position z8. The light beam 252 propagates into the reflective polarizer 202 and is reflected towards the third port 228. By adjusting the orientations of the first and second mirrors 210 and 214, the light beam 252 can be directed into the third port 228 with maximal coupling efficiency.

Various modifications may be made to the circulator 200. In one example, other lenses and/or mirrors may be used to redirect the light beam 252 from the reflective polarizer 202 to a third port that is not proximate to the first port. It will be appreciated that other variations such as those discussed above with respect to the first embodiment 100 may also be applicable to the second embodiment 200.

The first and third ports 224 and 228 may include first and third fibers 230 and 234 mounted in a ferrule 216 in a manner similar to that described above for the first and third fibers 142 and 146 of the first embodiment 100. A collimating lens 220, such as a GRIN lens, may be used to collimate light from the first fiber 230 and to focus light into the third fiber 234. Likewise, the second port may include a second fiber 232 mounted in a ferrule 218 and coupled to a collimating lens 222. It will be appreciated that the adjustable reflectors 214 and 210 may advantageously be used to align light from the second port 226 to the third port 228 in a manner as described above with respect to the first embodiment 100.

It will be appreciated that further modifications may be made to the embodiments described herein without departing from the scope of the invention. For example, the embodiments presented have shown a direct path from the first port to the second port, while the path from the second port to the third port includes reflection off the mirrors. The adjustability of the mirrors permits careful alignment from the second to the third ports. In other variations, the path from the first port to the second port may be made via the mirrors, while the path from the second port to the third port is direct. This may be configured for example, by arranging the light to enter the reflective polarizer from the first port with the reflecting polarization, while the light entering the reflective polarizer from the second port has the transmitting polarization.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. An optical circulator, comprising:
   a reflective polarizer adapted to transmit light having a first polarization direction and reflect light having a second polarization direction orthogonal to the first polarization direction;
   a first non-reciprocal polarization rotator positioned to transmit light propagating in a first direction from the reflective polarizer;
   a second non-reciprocal polarization rotator positioned to transmit light reflected by the reflective polarizer after propagating in a second direction opposite to the first direction;
   a first reflector positioned to reflect light from the second non-reciprocal polarization rotator to the reflective polarizer;
   a third non-reciprocal polarization rotator positioned to transmit light reflected by the first reflector; and
   a second reflector positioned to reflect light from the third non-reciprocal polarization rotator to the reflective polarizer;
   wherein at least one of the first and second reflectors is orientationally adjustable to alter a propagation path of a light beam propagating through the optical circulator.

2. A circulator as recited in claim 1, further comprising a polarizer positioned to remove light having the second polarization direction prior to propagation into the first non-reciprocal polarization rotator along the second direction.

3. A circulator as recited in claim 1, wherein the first reflector is positioned to reflect light from the second non-reciprocal polarization rotator back through the second non-reciprocal polarization rotator.

4. A circulator as recited in claim 1, wherein the second reflector is positioned to reflect light from the third non-reciprocal polarization rotator back through the third non-reciprocal polarization rotator.

5. A circulator as recited in claim 1, further comprising a first port optically coupled to the reflective polarizer to transmit light towards the reflective polarizer in the first direction and a second port optically coupled to receive light propagating from the reflective polarizer in the first direction.

6. A circulator as recited in claim 5, further comprising a third port spaced apart from the first port and optically coupled to receive light from the reflective polarizer in the second direction.

7. A circulator as recited in claim 5, wherein each port includes an optical fiber optically coupled to a lens.

8. The optical circulator of claim 1, wherein the first and second reflectors are both orientationally adjustable so as to adjust a propagation path of a light beam propagating through the optical circulator.

9. The optical circulator of claim 1, wherein the first and second reflectors are formed as reflecting coatings on surfaces of the second and third non-reciprocal polarization rotators respectively.

10. An optical circulator, comprising:
    a first birefringent splitting and combining element to split light traveling in a first direction into first and second beams that are orthogonally polarized and to combine third and fourth beams that are orthogonally polarized and traveling in a second direction opposite to the first direction;
    a first set of non-reciprocal polarization rotators positioned to transmit light travelling in the first direction from the first birefringent splitting and combining element, the first set including a first non-reciprocal polarization rotator to rotate a polarization direction of the first beam by 45 degrees in one direction and a second non-reciprocal polarization rotator to rotate a polarization direction of the second beam by 45 degrees in an opposite direction, wherein upon passing through the first set of non-reciprocal polarization rotators, the first and second beams have a same polarization direction;

a reflective polarizer positioned to receive the first and second beams from the first set of non-reciprocal polarization rotators, the reflective polarizer transmitting light having the first polarization direction and reflecting light having a second polarization direction orthogonal to the first polarization direction;

a second set of non-reciprocal polarization rotators positioned to transmit the first and second beams propagating from the reflective polarizer in the first direction, the second set of non-reciprocal polarization rotators including a third non-reciprocal polarization rotator to rotate a polarization of the first beam by 45 degrees in one direction and a fourth non-reciprocal polarization rotator to rotate a polarization of the second beam by 45 degrees in an opposite direction;

a second birefringent splitting and combining element positioned to receive the first and second lights beams from the second set of non-reciprocal polarization rotators, configured and arranged to combine the first and second beams, and to split light traveling in a second direction opposite to the first direction into the third and fourth beams;

a fifth non-reciprocal polarization rotator positioned to transmit light having the second polarization direction reflected by the reflective polarizer;

a first mirror positioned to reflect light from the fifth non-reciprocal polarization rotator;

a sixth non-reciprocal polarization rotator positioned to transmit light reflected by the first mirror; and a second mirror positioned to reflect light from the sixth non-reciprocal polarization rotator;

wherein at least one of the first mirror and second mirror is orientationally adjustable to alter a propagation path of a light beam propagating through the optical circulator.

11. A circulator as recited in claim 10, wherein the first mirror is a reflecting coating on a surface of the fifth non-reciprocal polarization rotator and the second mirror is another reflecting coating on the sixth non-reciprocal polarization rotator.

12. A circulator as recited in claim 10, further comprising a first port coupled to transmit light to the first birefringent splitting and combining element in the first direction and a second port coupled to receive light from the second birefringent splitting and combining element in the first direction.

13. A circulator as recited in claim 12, wherein the second port is further coupled to transmit light to the second birefringent splitting and combining element in the second direction and further comprising a third port coupled to receive light from the first birefringent splitting and combining element in the second direction.

14. A circulator as recited in claim 13, wherein the light received by the reflective polarizer from the first port in the first direction has the first polarization direction.

15. A circulator as recited in claim 14, wherein the light received by the reflective polarizer from the second port in the second direction has the second polarization direction and is reflected by the reflective polarizer through the fifth non-reciprocal polarization rotator to the first mirror, from the first mirror through the fifth non-reciprocal polarization rotator, the reflective polarizer and the sixth non-reciprocal polarization rotator to the second mirror, and from the second mirror through the sixth non-reciprocal polarization rotator to the reflective polarizer, and from the reflective polarizer to the third port in the second direction.

16. A circulator as recited in claim 13, wherein the light received by the reflective polarizer from the second port in the second direction has the first polarization direction.

17. A circulator as recited in claim 16, wherein the light received by the reflective polarizer from the first port in the first direction has the second polarization direction and is reflected by the reflective polarizer through the sixth non-reciprocal polarization rotator to the second mirror, from the second mirror through the sixth non-reciprocal polarization rotator, the reflective polarizer and the fifth non-reciprocal polarization rotator to the first mirror, and from the first mirror through the fifth non-reciprocal polarization rotator to the reflective polarizer, and from the reflective polarizer to the second port in the first direction.

18. The optical circulator of claim 10, wherein the first and third non-reciprocal polarization rotators are configured and arranged to rotate a polarization direction of light by 45° in a same direction.

19. The optical circulator of claim 10, wherein the first and third non-reciprocal polarization rotators are configured and arranged to rotate a polarization direction of light by 45° in opposite directions.

20. The optical circulator of claim 10, wherein the first and second mirrors are both configured and arranged to adjust a propagation path of a light beam propagating through the optical circulator.

21. A method of circulating light from a first port to a third port, comprising:

propagating light from a first port through a reflective polarizer to a second port;

propagating light from the second port into the reflective polarizer;

reflecting the light from the reflective polarizer to a first mirror;

reflecting the light from the first mirror through the reflective polarizer to a second mirror, wherein at least one of the first and second mirrors is adjustable to alter a propagation path of the light propagating between the first and second mirrors;

reflecting the light from the second mirror into the reflective polarizer; and reflecting the light from the reflective polarizer to a third port.

22. The method of claim 21, wherein propagating light from the second port into the reflective polarizer includes propagating light from the reflective polarizer through a second non-reciprocal polarization rotator and then to the third port.

23. The method of claim 21, wherein propagating light from a first port through a reflective polarizer includes propagating light from the reflective polarizer through a first non-reciprocal polarization rotator and then to the second port.

24. The method of claim 23, wherein propagating light from a first port through a reflective polarizer further includes propagating light from the first non-reciprocal polarization rotator through a polarizer and then to the second port.

25. The method of claim 23, wherein propagating light from the second port into the reflective polarizer includes propagating light from the second port through a first non-reciprocal polarization rotator and into the reflective polarizer, reflecting the light from the reflective polarizer to a first mirror includes reflecting the light from the reflective polarizer through a second non-reciprocal polarization rotator to the first mirror, reflecting light from the first mirror includes reflecting light from the first mirror through the second non-reciprocal polarization rotator, through the reflective polarizer, and through a third non-reciprocal polarization rotator, and reflecting light from the second mirror includes reflecting light from the second mirror through the third non-reciprocal polarization rotator and into the reflective polarizer.

26. The method of claim 21, wherein propagating light from a first port includes propagating light through a first birefringent splitting and combining element to split the light into a first light beam and a second light beam with orthogonal polarization directions, propagating the first and second light beams through first and second non-reciprocal polarization rotators, respectively and through the reflective polarizer, the first non-reciprocal polarization rotator rotating a polarization direction of the first light beam by 45° in one direction and the second non-reciprocal polarization rotator rotating a polarization direction of the second light beam by 45° in an opposite direction, propagating the first and second light beams from the reflective polarizer through third and fourth non-reciprocal polarization rotators, respectively, the third non-reciprocal polarization rotator rotating a polarization direction of the first light beam by 45° in one direction and the fourth non-reciprocal polarization rotator rotating a polarization direction of the second light beam by 45° in an opposite direction, combining the first and second beams in a second birefringent splitting and combining element, and propagating the combined first and second beams to the second port.

27. The method of claim 26, wherein propagating the light from the second port includes propagating the light from the second port through the second birefringent splitting and combining element and splitting the light into a third beam and a fourth beam with orthogonal polarization directions, and propagating the third and fourth light beams from the reflective polarizer through third and fourth non-reciprocal polarization rotators, respectively, into the reflective polarizer, the third non-reciprocal polarization rotator rotating a polarization direction of the third light beam by 45° in one direction and the fourth non-reciprocal polarization rotator rotating a polarization direction of the fourth light beam by 45° in an opposite direction.

28. The method of claim 27, wherein reflecting the light from the reflective polarizer to a first mirror comprises reflecting the third and fourth light beams from the reflective polarizer through a fifth non-reciprocal polarization rotator to the first mirror, reflecting light from the first mirror includes reflecting the third and fourth light beams from the first mirror through the fifth non-reciprocal polarization rotator, through the reflective polarizer, and through a sixth non-reciprocal polarization rotator, and reflecting light from the second mirror includes reflecting the third and fourth light beams from the second mirror through the sixth non-reciprocal polarization rotator and into the reflective polarizer.

29. The method of claim 27, wherein reflecting light from the reflective polarizer to a third port includes reflecting the third and fourth beams from the reflective polarizer through the first and second non-reciprocal polarization rotators respectively, the first non-reciprocal polarization rotator rotating a polarization direction of the third beam by 45° in one direction and the second non-reciprocal polarization rotator rotating a polarization direction of the fourth beam by 45° in an opposite direction, combining the third and fourth beams in the first birefringent splitting and combining element, and propagating the combined third and fourth beams to the third port.

30. The method of claim 29, wherein both the first and second mirrors are adjustable to alter a propagation path of a light beam propagating between the mirrors.

31. A method of circulating light from a first port to a third port, comprising:

propagating light from a first port into a reflective polarizer;

reflecting the light from the reflective polarizer to a first mirror;

reflecting the light from the first mirror through the reflective polarizer to a second mirror, wherein at least one of the first and second mirrors is adjustable to alter a propagation path of the light propagating between the first and second mirrors;

reflecting the light from the second mirror into the reflective polarizer;

reflecting the light from the reflective polarizer to a second port; and propagating light from the second port through the reflective polarizer to a third port.

32. A circulator, comprising:

means for propagating light from a first port to a second port in first and second mutually orthogonal polarizations along substantially parallel paths through a reflective polarizer;

means for propagating light from the second port to a third port through the reflective polarizer;

means for nonreciprocally rotating polarization of light passing from the first port to the second port and from the second port to the third port; and means for reflecting light deflected by the reflective polarizer back to the reflective polarizer, the means for reflecting light being adjustable so as to alter a propagation path of the light propagating between one of the first and second ports and the second and third ports.

* * * * *